(12) United States Patent  
Yamamoto

(10) Patent No.: US 8,760,730 B2  
(45) Date of Patent: Jun. 24, 2014

(54) IMAGE READING APPARATUS FOR READING IMAGE OF ORIGINAL DOCUMENT

(71) Applicant: Canon Kabushiki Kaisha, Tokyo (JP)

(72) Inventor: Yuichi Yamamoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/778,535

(22) Filed: Feb. 27, 2013

(65) Prior Publication Data

US 2013/0258422 A1    Oct. 3, 2013

(30) Foreign Application Priority Data

Mar. 29, 2012    (JP) .................................. 2012-077805

(51) Int. Cl.  
*H04N 1/04* (2006.01)

(52) U.S. Cl.  
USPC .......................................... 358/474; 358/486

(58) Field of Classification Search  
CPC ..... H04N 1/1061; H04N 1/193; H04N 1/401; H04N 1/0287; H04N 1/10; H04N 2201/0446  
USPC .................. 358/474, 501, 486, 406, 412, 463  
See application file for complete search history.

(56) References Cited

U.S. PATENT DOCUMENTS

| | | | | |
|---|---|---|---|---|
| 5,198,909 A | * | 3/1993 | Ogiwara et al. | 358/412 |
| 6,687,024 B1 | * | 2/2004 | Short et al. | 358/474 |
| 7,378,644 B2 | * | 5/2008 | Kubota et al. | 250/234 |
| 7,508,554 B2 | * | 3/2009 | Tomita et al. | 358/483 |
| 8,064,105 B2 | * | 11/2011 | Murakami et al. | 358/461 |
| 8,159,727 B2 | * | 4/2012 | Yoshimaru et al. | 358/474 |
| 8,422,093 B2 | * | 4/2013 | Ishida | 358/475 |
| 8,482,809 B2 | * | 7/2013 | Mikami | 358/406 |
| 8,571,425 B2 | * | 10/2013 | Nakaie et al. | 399/16 |

FOREIGN PATENT DOCUMENTS

JP    3-009661 A    1/1991

* cited by examiner

*Primary Examiner* — Negussie Worku  
(74) *Attorney, Agent, or Firm* — Fitzpatrick, Cella, Harper & Scinto

(57) ABSTRACT

The sizes of a sealing member in the X-direction and of a white shading plate in the X-direction are designed so that a peripheral end of the white shading plate faces an adhesive material layer of the sealing member. No gap is generated between the sealing member and the white shading plate. Further, the sealing member includes a white base material layer, so that the sealing member itself, as with the white shading plate, easily reflects light, resulting in a reduction in loss in the amount of light in this area.

11 Claims, 9 Drawing Sheets

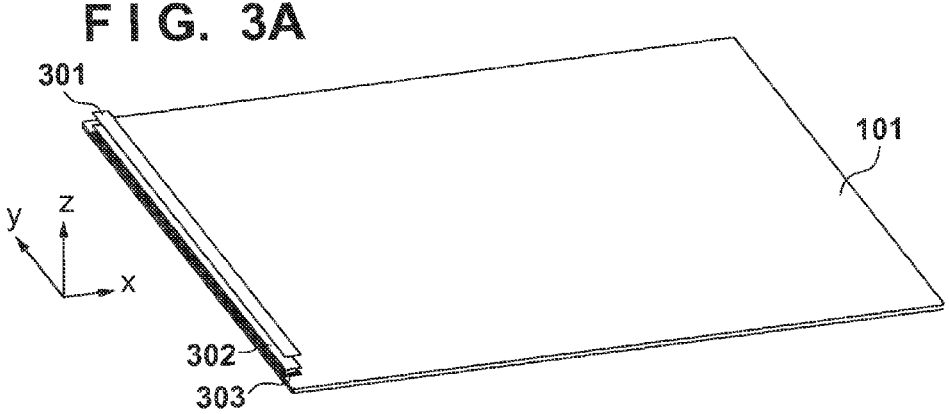
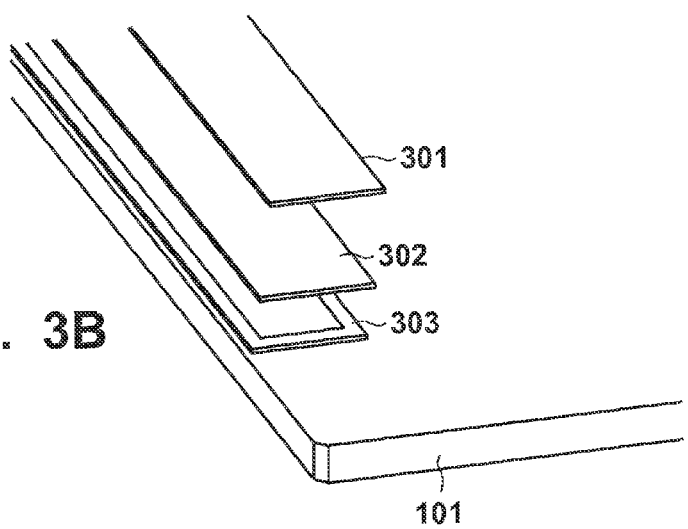
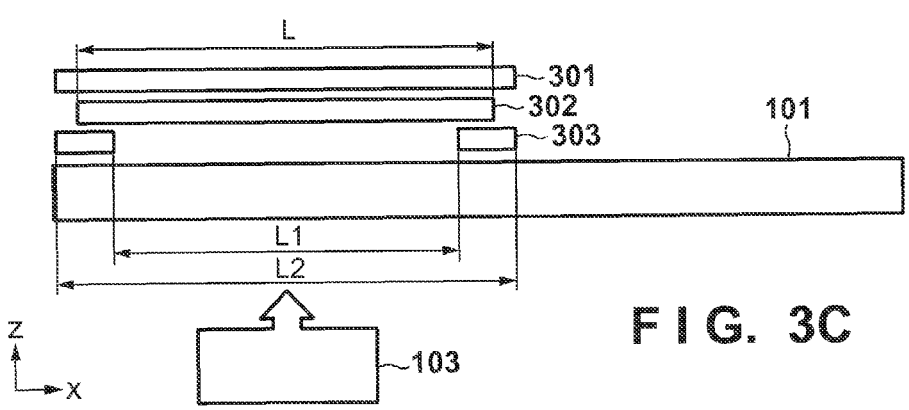

IMAGE READING APPARATUS FOR READING IMAGE OF ORIGINAL DOCUMENT

BACKGROUND OF THE INVENTION

1. Field of the Invention

The present invention relates to an image reading apparatus for reading an image of an original document.

2. Description of the Related Art

Image reading apparatuses have become widely used as copiers, facsimiles, and image scanners. Image reading apparatuses perform shading correction in order to reduce density unevenness. In the shading correction, correction coefficients are generated by reading a white reference member (hereinafter referred to as a "white shading plate"), and image data is corrected using the correction coefficients. Since the white shading plate is a reference for white, the white shading plate should of course not become dirty, nor should a foreign substance such as dust be incorporated into or adhere to the white shading plate. Japanese Patent Laid-Open No. 03-9661 discloses that an original document placement face plate, which indicates the position where the original document is placed, is pasted to an original document platen with a double-sided tape, and the rear side of the original document placement face plate is defined as a white reference surface.

Recently, it is desired to further downsize image reading apparatuses. Downsizing of the image reading apparatuses may cause deterioration in accuracy of shading correction. The reason for the deterioration will be described with reference to FIGS. 9A and 9B. FIGS. 9A and 9B are diagrams illustrating a configuration of a white shading plate of a conventional apparatus. In FIG. 9A, the X-axis direction refers to a so-called sub scanning direction, and the Y-axis direction refers to a main scanning direction. The Z-axis direction refers to a direction perpendicular to an original platen glass 101. At the left end of the original platen glass 101, a white shading plate 302', a sealing member 303' such as a double-sided tape that is disposed around the white shading plate 302', and a protection sheet 301' for sealing the white shading plate 302' are provided. The sealing member 303' is a frame-shaped member whose inside is cut out.

The sealing member 303' is an adhesive member that is slightly yellowish, thus having a lower light reflectance than the white shading plate 302'. Therefore, loss in the amount of light occurs in the sealing member 303'. As illustrated in FIG. 9B, the length L' of a side of the white shading plate 302' in the X-direction is shorter than the inside dimension L1' of the cutout of the sealing member 303' (the length in the X-direction), so that a "gap Δ" is generated therebetween. Also in this "gap Δ", loss in the amount of light is caused.

Accordingly, due to the loss in the amount of light in the sealing member 303' and the gap Δ, the reduction in luminance level (white level) near ends of the white shading plate 302' (near the sealing member 303') is greater than near the central part of the white shading plate 302'. That is, near ends of the white shading plate 302' that are affected by the loss in the amount of light, it is impossible to determine the correction coefficients with high accuracy. Therefore, a region that is usable as a reference for white may be limited to the region near the central part of the white shading plate 302'. Although the problem can be solved by making the white shading plate 302' wider in the X-direction, this makes it impossible to downsize the white shading plate 302'. Accordingly, in a conventional method, when accuracy of the shading correction takes priority, then downsizing is difficult, on the other hand, when downsizing takes priority, then the accuracy of the shading correction deteriorates.

SUMMARY OF THE INVENTION

Addressing the foregoing, the present invention provides an image reading apparatus in which a white reference member can have a narrower width in a direction of a shorter side thereof than that of a conventional product, while preventing a reduction in shading accuracy.

According to the embodiment, an image reading apparatus comprising the following elements is provided. An original platen glass has translucency on which an original document can be placed. A reading unit reads the original document placed on the original platen glass. A white reference member is fixed on the original platen glass with the use of a sealing member. A surface of the sealing member is in contact with the original platen glass being white. The white reference member and the sealing member overlap each other at ends of the white reference member in a direction of a shorter side thereof.

Further features of the present invention will become apparent from the following description of exemplary embodiments (with reference to the attached drawings).

BRIEF DESCRIPTION OF THE DRAWINGS

FIGS. 3A, 3B and 3C are diagrams illustrating an arrangement and a configuration of a white reference member.

DESCRIPTION OF THE EMBODIMENTS

Figure 1:
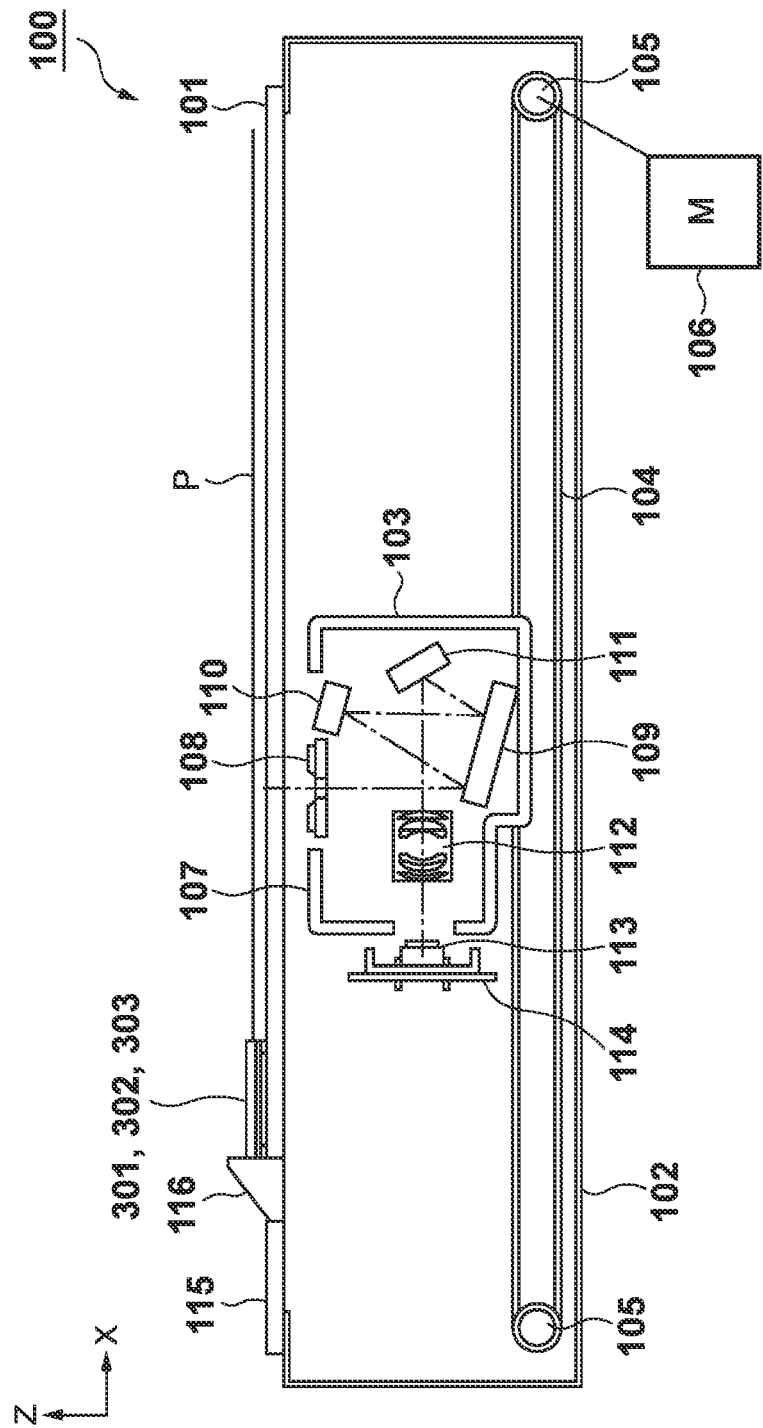
FIG. 1 is a cross-sectional view schematically illustrating an image reading apparatus.

A schematic configuration of an image reading apparatus 100 is described with reference to FIG. 1. An original platen glass 101 is an original document platen or a platen on which an original document P is placed. The original platen glass 101 has translucency, that is, transparence. A casing 102 is a support member for supporting the original platen glass 101. A scan unit 103 includes an illumination system, an optical system, and the like for reading an image of an original document. The scan unit 103 works as a reading unit configured to read the original document placed on the original platen glass 101. A belt 104 moves the scan unit 103 in the sub scanning direction. A pulley 105 transmits driving power from a motor 106 to the belt 104. The motor 106 rotates the pulley 105 so as to let the belt 104 rotate.

In the scan unit 103, various components are mounted on a carriage casing 107. An illumination unit 108 is a light source for illuminating the original document P. Reflection mirrors 109, 110, and 111 are optical components for guiding light that was diffused by the original document P to a CCD 113. A lens 112 is an optical component for imaging light on the CCD 113. The CCD 113 is a photoelectric conversion element for photoelectrically converting incident light so as to output an image signal. Commonly, the CCD 113 is a line sensor in which light receiving elements are arranged in the main scanning direction. An electric component substrate 114 is a substrate that is provided with a drive circuit for driving the CCD 113.

At an end of an original document placement surface of the original platen glass 101, a white reference member, which serves as a white reference for shading correction, is provided. The white reference member is constituted by a white shading plate 302, a sealing member 303, and a protection sheet 301. The white shading plate 302 itself may also be referred to as the white reference member. After being instructed to read an image of the original document P, the scan unit 103 moves beneath the white shading plate 302, reads the white shading plate 302, and generates correction coefficients for shading correction.

The image reading apparatus 100 is provided with a flow reading glass 115 for reading an image of the original document that was delivered by an original document feed apparatus (ADF) (not shown). The scan unit 103 stops beneath the flow reading glass 115 and the original document itself moves in the sub scanning direction. The original document passes over the flow reading glass 115 and then is guided to an ejection portion by slope guide 116.

In the present embodiment, the main scanning direction is a direction that corresponds to a direction in which the light receiving elements of the CCD are arranged at an original document read position. Moreover, the sub scanning direction is a direction in which the original document is transported on the flow reading glass 115 or in which the scan unit 103 moves when reading the original document placed on the original platen glass 101. The main scanning direction is substantially perpendicular to the sub scanning direction.

Figure 2:
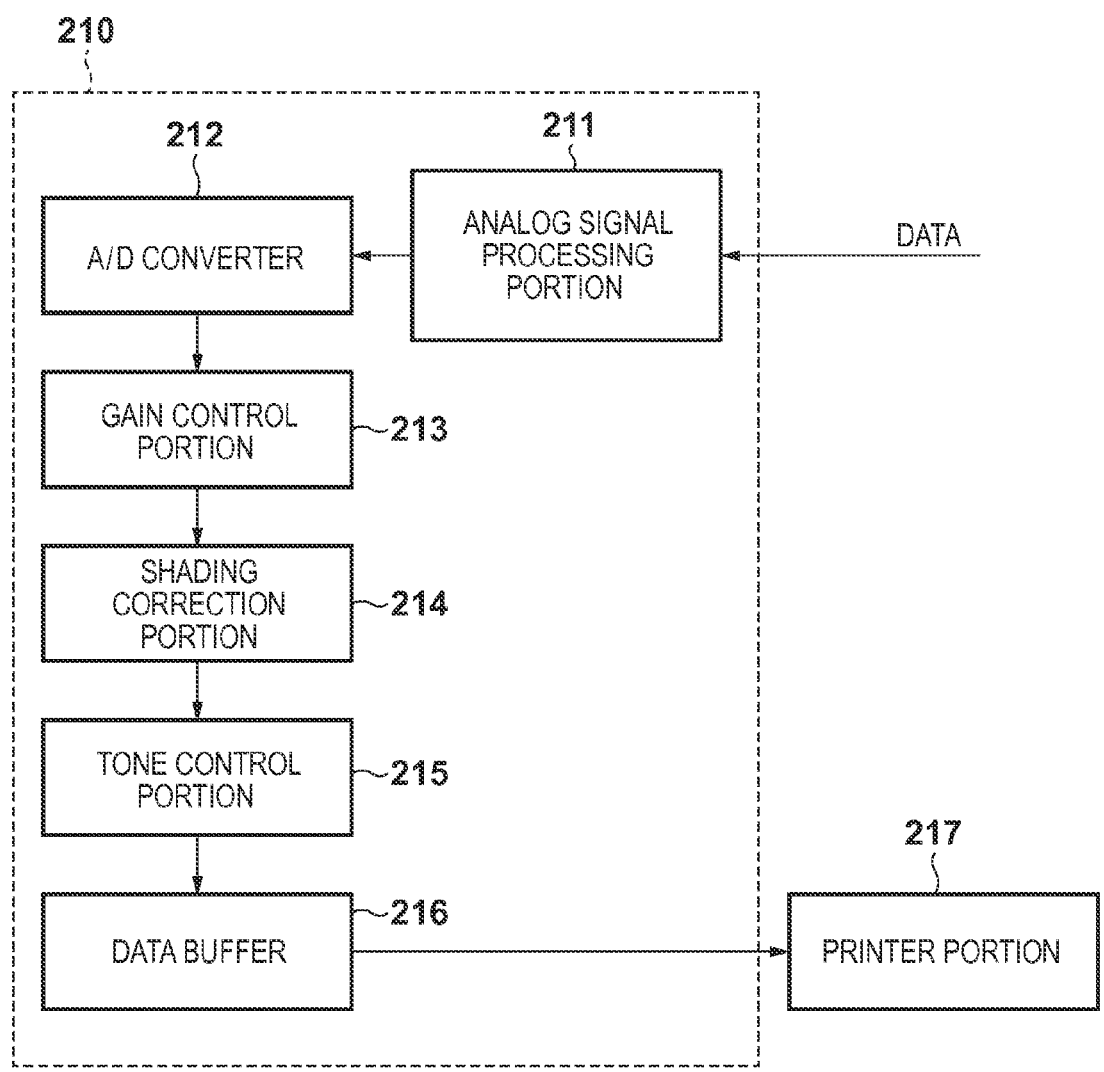
FIG. 2 is a block diagram illustrating an image processing portion.

The following is a detailed description of shading correction with reference to FIG. 2. In order to generate correction coefficients for shading correction, the scan unit 103 moves beneath the white shading plate 302 so as to read the white shading plate 302. An image signal (DATA) that is output by the CCD 113 is input to an analog signal processing portion 211 of the image processing portion 210. The analog signal processing portion 211 applies sensitivity correction to the analog image signal. "Sensitivity correction" refers to processing for correcting a variation in the sensitivities of the light receiving elements constituting the CCD 113. The A/D converter 212 converts the analog image signal into a digital image signal. A gain control portion 213 controls a gain of the digital image signal. A shading correction portion 214 generates correction coefficients for shading correction based on the read results of the white shading plate 302. Specifically, the correction coefficients that correspond to pixel locations in the main scanning direction are calculated so that the values of the image signals of the white shading plate 302 on the pixel locations in the main scanning direction become equal to predetermined values serving as references. The shading correction portion 214 subjects the image signal to shading correction, using the correction coefficients of the original document P. A tone control portion 215 corrects the gradation characteristic of the image signal, and outputs it to a data buffer 216. The image signal stored in the data buffer 216 is then output to a printer portion 217, a memory device, a host computer, and the like. The printer portion 217 functions as an image forming unit for forming, on the recording material, the image that was read by the image reading apparatus 100. The present invention may also be realized as an image forming apparatus that includes the image reading apparatus 100 and the printer portion 217.

Figure 4:
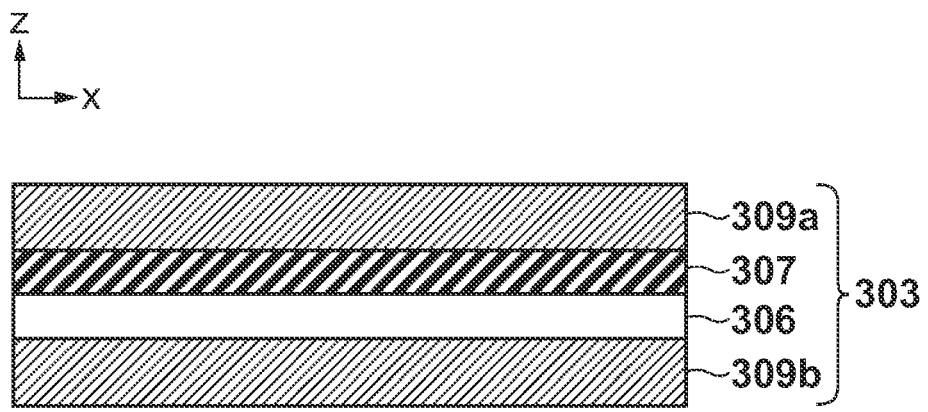
FIG. 4 is a cross-sectional view illustrating a configuration of a sealing member.

The following will describe a configuration of the white reference member with reference to FIGS. 3A to 3C, and 4. FIG. 3A is a perspective view illustrating the original platen glass 101 and the white reference member. FIG. 3B is an enlarged view of the white reference member. FIG. 3C is a cross-sectional view taken along the XZ-plane of the original platen glass 101 and the white reference member. FIG. 4 is a cross-sectional view taken along the XZ-plane of the sealing member 303.

As illustrated in FIGS. 3A and 3B, the white reference member is disposed near the left end of the original platen glass 101. This is because the white reference member is also used as an original document bump member. The use of the white reference member also as the original document bump member makes it easy to downsize the image reading apparatus 100.

The white shading plate 302 has a reflection density of, for example, 0.03 to 0.07. A white surface of the white shading plate 302 is fixed so as to face a surface of the original platen glass 101 on which the original document P is placed (the top surface side in the drawing). That is, the white surface of the white shading plate 302 faces in a downward direction. The white shading plate 302 is fixed on the original platen glass 101 with the sealing member 303, which is a double-sided tape.

As illustrated in FIG. 4, the sealing member 303 has a four-layer structure. The first layer from the bottom is a first adhesive material layer that faces the original document placement surface. The first adhesive material layer is constituted by an adhesive material that has translucency, such as an acrylic adhesive 309b. The second layer from the bottom is a white base material layer that is arranged on the adhesive material layer. The white base material layer is constituted by, for example, a white base material 306 that is made from polyester. Light from the illumination unit 108 is reflected by the white base material 306. Therefore, loss in the amount of the light due to the sealing member 303 can be reduced. The characteristics of the white base material 306 (white level) are designed to be substantially equal to those of the white shading plate 302. The sealing member 303 is adhered to the original platen glass 101 with the acrylic adhesive 309b so that the white base material 306 is located on the original platen glass 101 side. In the present embodiment, a black base material 307 that is made from polyester is arranged as the third layer, and a second adhesive material layer that faces a peripheral end of the white reference member is arranged as the forth layer. The second adhesive material layer is made from, for example, an acrylic adhesive 309a.

As illustrated in FIGS. 3B and 3C, the sealing member 303 is pasted to the original document placement surface of the original platen glass 101, and has a cutout portion in the center. The cutout portion has a shape of, for example, a rectangle, but this is not essential. The white shading plate 302 is fixed on the original document placement surface, with the sealing member 303 intervening therebetween. When seen from a surface that is opposite to the original document placement surface, part of the white shading plate 302 is exposed from the cutout portion of the sealing member 303. The color of the surface of the sealing member 303 that is in contact with the original platen glass 101 is white. The scan unit 103 reads the white reference member from the surface opposite to the original document placement surface via the cutout portion.

Figure 9A:
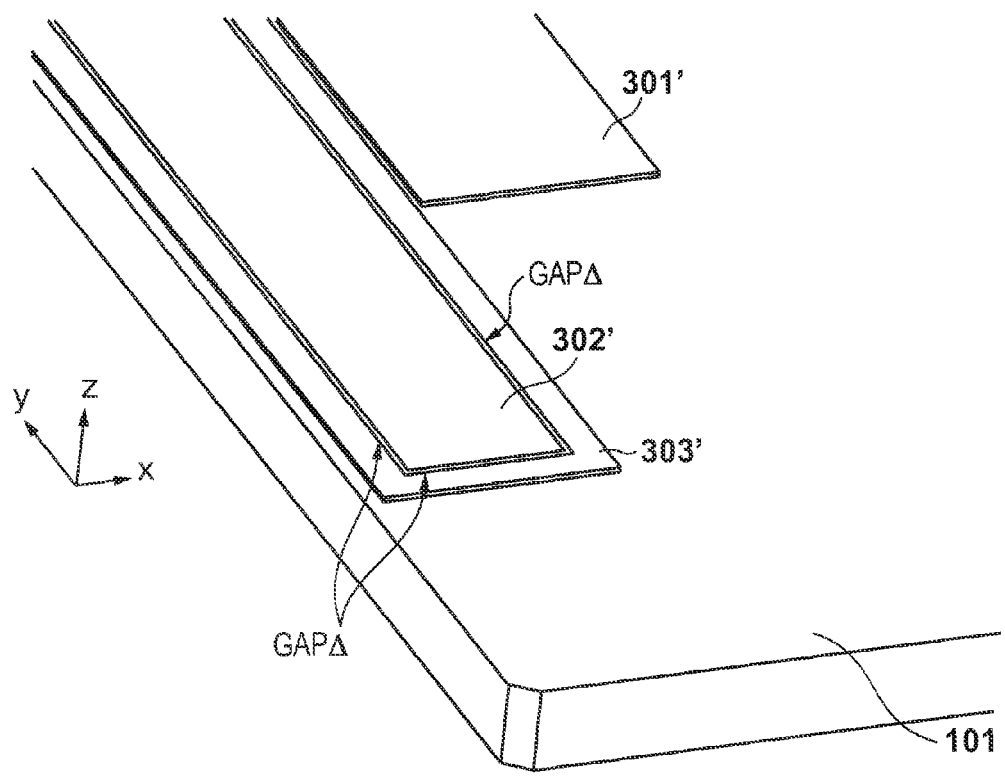
FIGS. 9A and 9B are diagrams illustrating a white reference member of a comparative example.
Figure 9B:
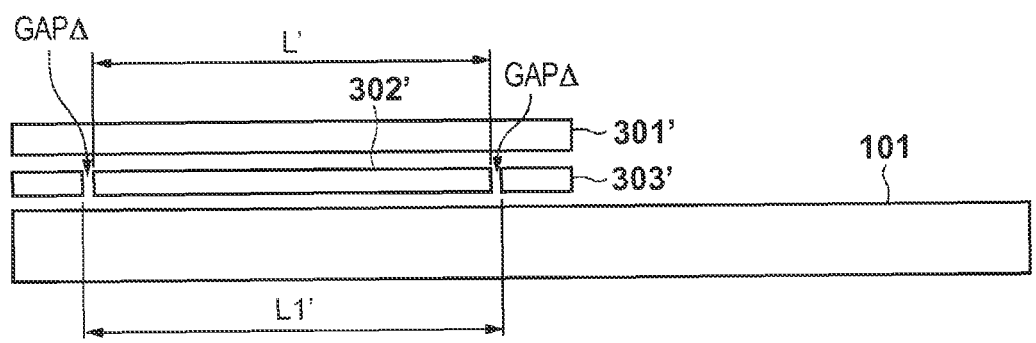

As illustrated in FIG. 3C, the length L of the white shading plate 302 in a direction of a shorter side thereof (X-direction)

is longer than the width L1 of the cutout portion of the sealing member 303 in a direction of a shorter side thereof (X-direction). Accordingly, the peripheral end of the white shading plate 302 is adhered to the acrylic adhesive 309a. Therefore, no gap Δ as illustrated in FIGS. 9A and 9B is generated. In other words, at the ends of the white shading plate 302 in the direction of a shorter side thereof, the white shading plate 302 and the sealing member 303 are adhered to each other without a gap therebetween. Therefore, no loss in the amount of light, as caused by the gap Δ, is generated. Further, the length L2 of the outside dimension of the sealing member 303 in the X-direction is longer than the length L of the white shading plate 302 in the X-direction. Here, however, L=L2 or L>L2 is also possible. This is because as long as L>L1 is satisfied, no gap Δ is generated, irrespective of L2.

In the present embodiment, the direction of a shorter side (X-direction) corresponds to the sub scanning direction in which the scan unit 103 moves.

The protection sheet 301 is arranged on the white shading plate 302. The outer shape of the protection sheet 301 is set to be equivalent to or slightly greater than the outer shape of the white shading plate 302. This prevents the white shading plate 302 from being damaged and a foreign substance such as dust from entering between the white shading plate 302 and the original platen glass 101.

Figure 5A:
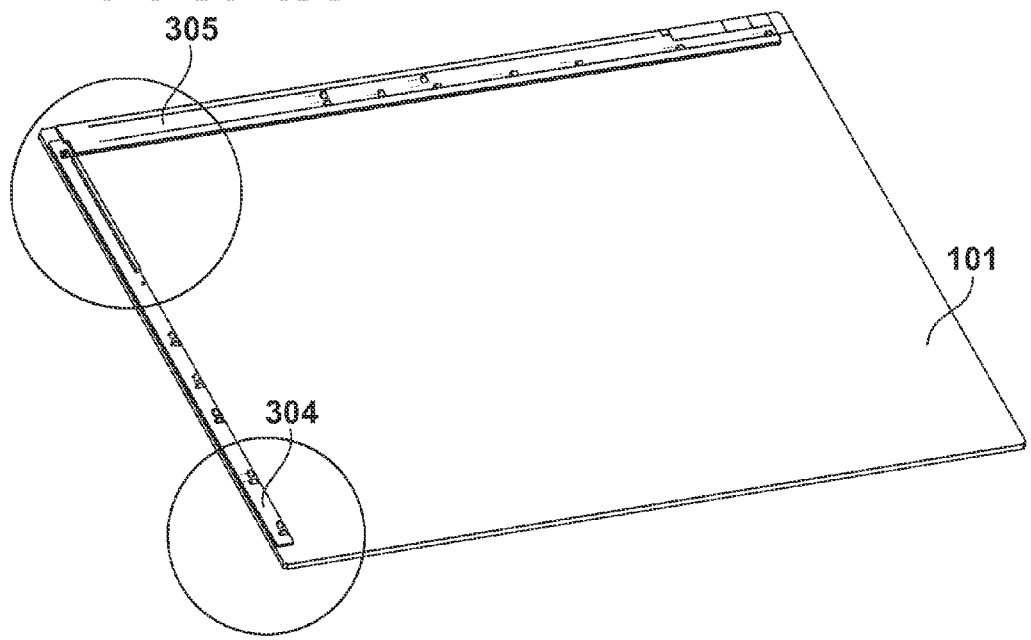
FIGS. 5A and 5B are diagrams illustrating a protection seal provided with an original document size indication.
Figure 5B:
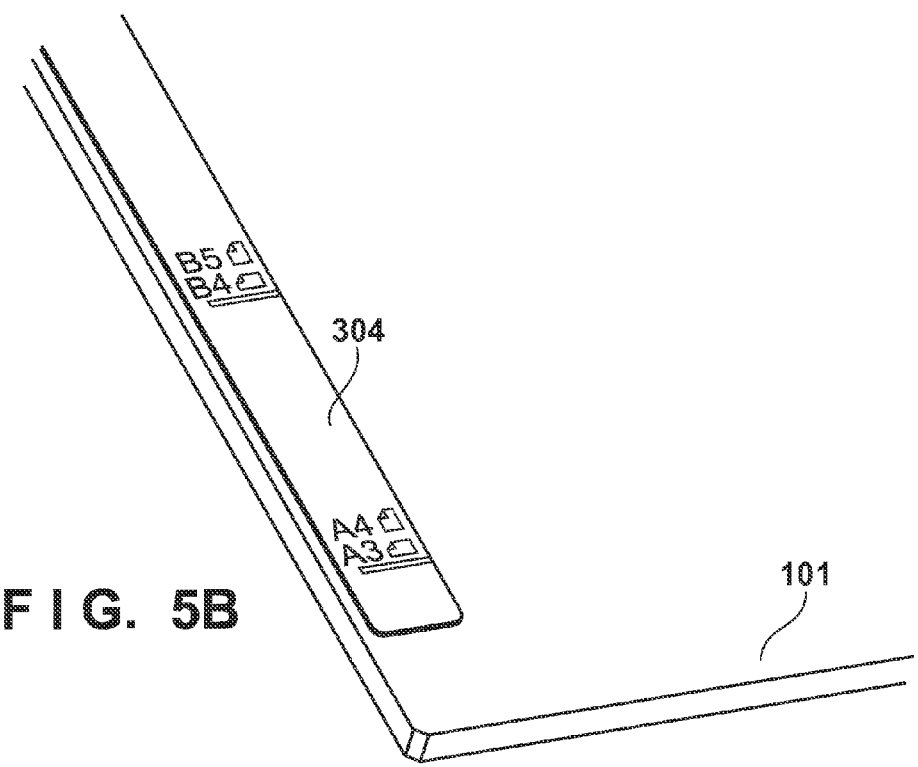

FIGS. 5A and 5B are diagrams illustrating an example in which the protection sheet 301 serves as a set reference (bump reference) for an original document placed on the original platen glass 101 and as a measure of the size of the original document. A size indication 304 is a size indication that is arranged in the main scanning direction and doubles as the protection sheet 301. The size indication 304 has a plurality of indications that serve as standards of sizes (for example, A5, postcard, B5, A4, and the like) of original documents. The size indication 304 is also used as a set reference for the original document P in the sub scanning direction. A size indication 305 is a size indication arranged in the sub scanning direction. The size indication 305 is also used as a set reference for the original document P in the main scanning direction. The white shading plate 302 and the sealing member 303 are provided beneath the size indication 304.

Figure 6A:
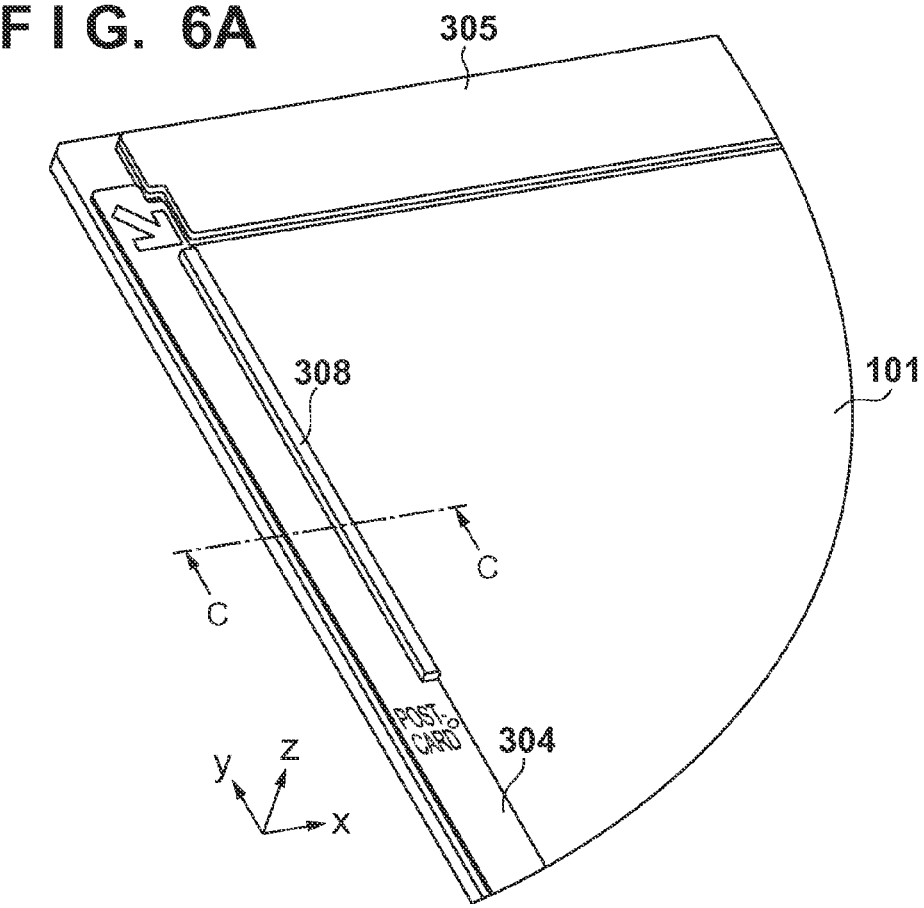
FIGS. 6A and 6B are diagrams illustrating an arrangement of a bump member and a relationship between the processing section and a skim guide.

FIG. 6A is an enlarged view of the vicinity of an intersection of the size indication 304 and the size indication 305. A bump projecting portion 308 is arranged on the size indication 304. The bump projecting portion 308 is a bump member that is salient from the top of the protection sheet 301 in the direction of the thickness of the original platen glass 101 (Z-direction). The direction (Y-direction) of a longer side of the bump projecting portion 308 is parallel to the main scanning direction (Y-direction) of the image reading apparatus 100, and the direction (X-direction) of a shorter side of the bump projecting portion 308 is parallel to the sub scanning direction of the image reading apparatus 100. By the original document P bumping against the bump projecting portion 308, the bump projecting portion 308 aligns the original document P in a predetermined position. In this manner, the bump projecting portion 308 serves as a set reference (bump reference) for the original document P placed on the original platen glass 101. The bump projecting portion 308 is adhered to and fixed on the protection sheet 301 so as to be coplanar with the surface of the protection sheet 301 that functions as the original document set reference.

Figure 6B:
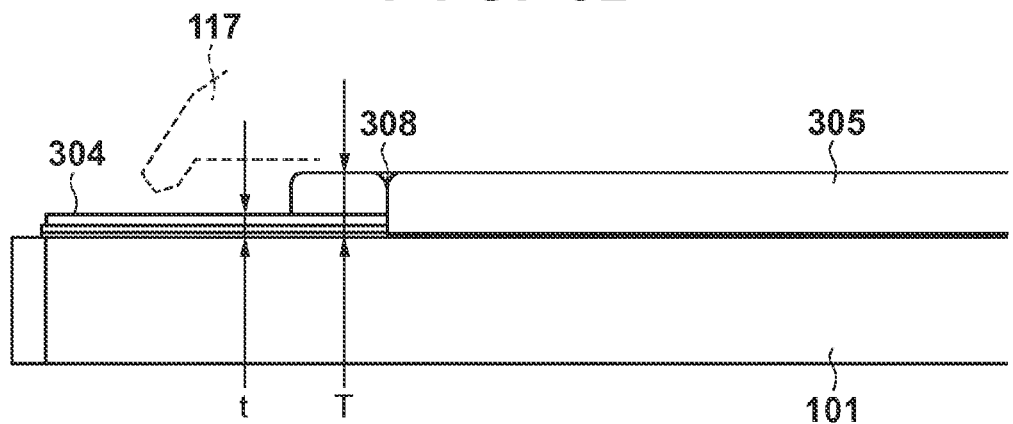

FIG. 6B is a cross-sectional view taken along the line C-C near the bump projecting portion 308. As illustrated in FIG. 6B, t denotes the height from the top surface of the original platen glass 101 to the protection sheet 301. On the other hand, T denotes the height from the top surface of the original platen glass 101 to the bump projecting portion 308 (T>t). The provision of the bump projecting portion 308 increases the height of the bumping portion, allowing an improvement in the setting property (bump property) for an original document.

The length of the bump projecting portion 308 in the direction of its longer side (Y-direction) is designed to be shorter than a length, in the sub scanning direction, of an original document of the smallest size (for example, A5 or postcard) of the original document sizes indicated by the plurality of indications on the size indication 304. The width of the bump projecting portion 308 in a direction of a shorter side thereof (Y-direction) is narrower than the width of the size indication 304. Further, the bump projecting portion 308 is fixed on the size indication 304 on the side close to an original document set reference surface (bump reference surface). The reason why the length of the bump projecting portion 308 in the main scanning direction is shorter than the length of the original document of the smallest size is to prevent impairment of legibility of characters and scales that are printed on the size indication 304 (protection sheet 301). In other words, the plurality of indications may be printed in locations on a surface of the protection sheet 301 where they do not overlap the bump projecting portion 308. This can reduce the necessity of making characters and scales smaller, and solves the problem that characters and scales are hidden by the bump projecting portion 308. The reason why the width of the bump projecting portion 308 in the sub scanning direction is narrower than the width of the size indication 304 is to prevent the bump projecting portion 308 and the skim guide 117 from interfering with each other.

Figure 7:
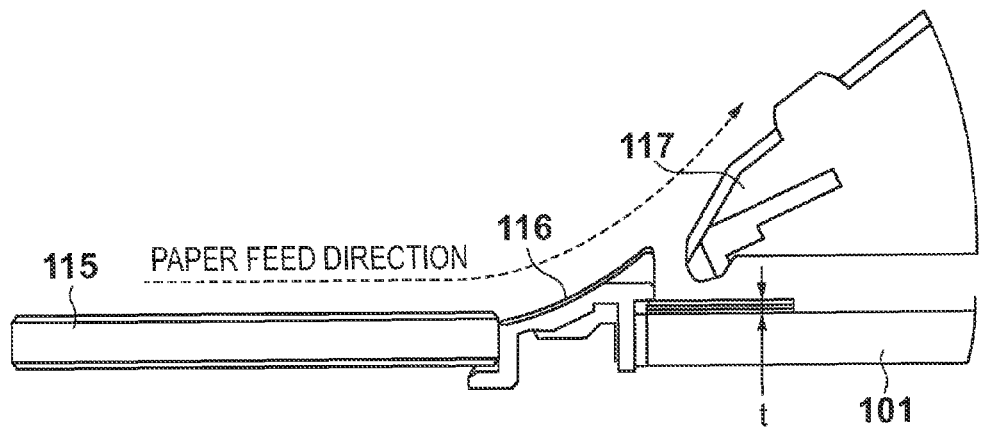
FIG. 7 is a cross-sectional view illustrating the skim guide.

FIG. 7 is a cross-sectional view illustrating the vicinity of the skim guide. Like the slope guide 116, the skim guide 117 is a member for limiting the direction in which an original document is transported. If the skim guide 117 is configured so as to extend in the height direction, then the image reading apparatus 100 will become larger. Therefore, by making the width of the bump projecting portion 308 in the sub scanning direction narrower than the width of the size indication 304 and arranging the bump projecting portion 308 on the side close to the original document set reference surface, the image reading apparatus 100 can be easily downsized.

Although, in the present embodiment, it is explained that the white base material 306 of the sealing member 303 has characteristics (white level) that are substantially the same as the characteristics of the white shading plate 302, its characteristics are not limited to this. This is because if the reflection density, as measured by a reflection density meter, of the white base material 306 of the sealing member 303 is not greater than 0.15, then a sufficient accuracy of the shading correction can be maintained. Although, in the present embodiment, the bump projecting portion 308 is configured as a member that is separated from the protection sheet 301, it is also possible that the bump projecting portion 308 is integrated with the protection sheet 301.

Figure 8:
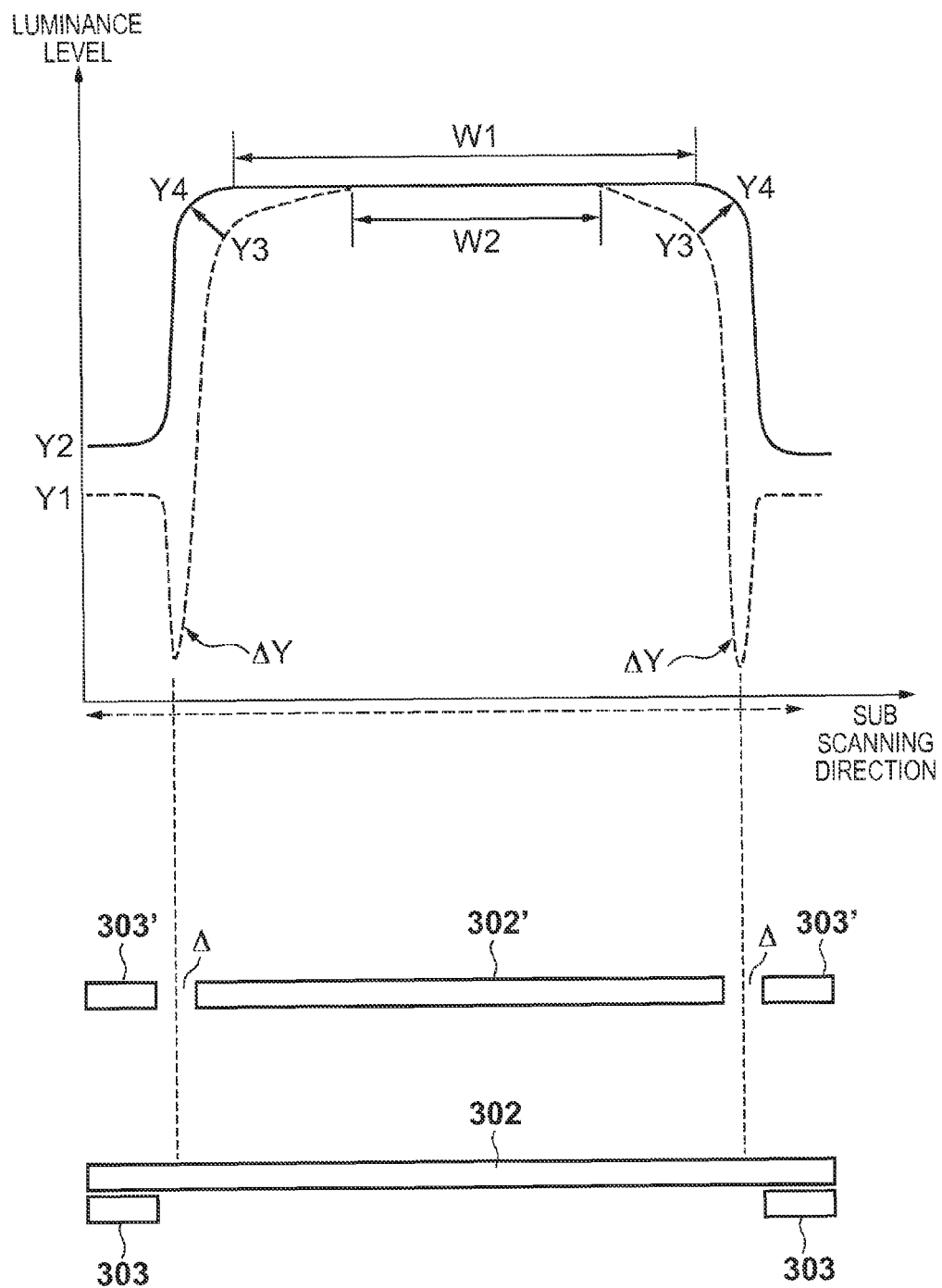
FIG. 8 is a diagram illustrating a sub scanning luminance profile.

A sub scanning luminance profile of the white reference member of the present embodiment is compared with a sub scanning luminance profile of a conventional white reference member with reference to FIG. 8. In FIG. 8, the vertical axis denotes the luminance level of an image obtained by the scan unit 103 reading the white shading plate 302 in a predetermined position (in present embodiment, substantially near the center) in the main scanning direction. The horizontal axis denotes the sub scanning position. That is, brightness data are plotted that are obtained by the scan unit 103 moving over an extent indicated by the width L2 in FIG. 3C and reading the white shading plate 302. The solid line denotes the luminance level of the present embodiment, and the dashed line denotes the luminance level of a comparative example in which there is a gap Δ.

In the comparative example illustrated in FIGS. 9A and 9B, loss in amount of light is caused since the sealing member 303' is a yellowish adhesive member. In FIG. 8, the luminance level when reading the sealing member 303' is shown as Y1. In contrast, the sealing member 303 of the present embodiment has the white base material 306, which has substantially the same reflection density as that of the white shading plate 302. Therefore, the luminance level of the sealing member 303 of the present embodiment is improved to Y2. In this manner, the reduction in loss in amount of light leads to an improvement of the luminance level from Y1 to Y2.

As illustrated in FIGS. 9A and 9B, in the configuration of the comparative example, there is the "gap Δ" between the white shading plate 302' and the sealing member 303'. In the comparative example, since there is little light that is reflected in this area and incident on the CCD 113, significant loss in the amount of light is caused. This is indicated by ΔY in FIG. 8.

This is because the light that is incident on the CCD 113 includes not only light that is directly reflected by an object to be read but also light that is reflected by circumference of the object to be read and is incident thereon (reflection). Therefore, near each "gap Δ", the luminance level is reduced due to the reduced reflection from the "gap Δ", relative to the luminance level in a W2 portion.

In contrast, according to the present embodiment, the white shading plate 302 overlaps the sealing member 303, so that no gap Δ is generated. Therefore, hardly any loss in the amount of light is caused in this area. Further, as the sealing member 303 of the present embodiment, a sealing member is used whose reflection density is substantially the same as that of the white shading plate 302, so that the luminance level of the sealing member is improved. With these measures, it is possible to improve the amount of light reflected from the members other than the white shading plate 302.

According to the configuration of the present embodiment, with these measures, the luminance level near the ends of the white shading plate 302 is improved from Y3 to Y4. Further, an effective region that is located close to the center of the white shading plate 302 and usable for the shading correction expands from W2 to W1. Since the effective region usable for the shading correction can be extended in this manner according to the present invention, it is possible to achieve downsizing of the white shading plate 302 and of the image reading apparatus 100, while maintaining the accuracy of the shading correction.

The following is an explanation of why a predetermined width is needed as an effective region W. In order to let the scan unit 103 stop at a predetermined shading location (in the case of the present embodiment, the central portion of the white shading plate 302 in the sub scanning direction), a location sensor (not shown) for detecting the location of the scan unit 103 is needed. Due to a sensing error of the sensor, variations (tolerances) of intervenient members, and the like, a variation may be caused in the location where the scan unit 103 stops. Taking into consideration this variation in the location where the scan unit 103 stops, it is necessary to keep the region W usable for the shading correction with a sufficient width (in the present embodiment, W is about 4 mm, for example).

As described above, the "gap Δ" outside of the white shading plate 302 and the luminance level of the "sealing member 303" affect the luminance level at the ends of the white shading plate 302. This is because the light that is incident on the CCD 113 includes not only light that is directly reflected by an object to be read but also light that is reflected by the circumference of the object to be read and is incident thereon (reflection). Therefore, according to the present embodiment, gaps Δ are eliminated and a member whose reflection density is close to that of the white shading plate 302 is used as the sealing member 303 that is adjacent to the white shading plate 302. These measures are effective for maintaining the accuracy of the shading correction.

In the present embodiment, of the gaps that can be generated between the white shading plate 302 and the sealing member 303, the focus is on the gaps at the ends in the sub scanning direction. The influence on the shading correction that is exerted by gaps generated at ends in the main scanning direction is so minor that it is not required to eliminate these gaps. However, in view of preventing dust from entering between the white shading plate 302 and the original platen glass 101, it is also possible to eliminate the gaps at the ends in the main scanning direction.

In the present embodiment, loss in the amount of light is reduced by eliminating the gaps Δ and employing the sealing member 303 made from a white base material. However, it is also possible to apply only either one of them. If a sufficient reduction in loss in the amount of light can be achieved only by eliminating the gaps Δ, it is possible to employ an inexpensive double-sided tape as the sealing member 303. On the other hand, if a sufficient reduction in loss in the amount of light can be achieved only by employing the sealing member 303 made from a white base material, the gaps Δ may be present.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-077805, filed Mar. 29, 2012 which is hereby incorporated by reference herein in its entirety.

What is claimed is:

1. An image reading apparatus comprising:
   an original platen glass having translucency on which an original document can be placed;
   a reading unit configured to read the original document placed on the original platen glass; and
   a white reference member that is fixed on the original platen glass with the use of a sealing member,
   wherein a surface of the sealing member that is in contact with the original platen glass being white,
   the white reference member and the sealing member overlapping each other at ends of the white reference member in a direction of a shorter side thereof.

2. The image reading apparatus according to claim 1,
   wherein the sealing member has a cutout portion in its center,
   the white reference member is fixed on an original document placement surface of the original platen glass, with the sealing member intervening therebetween,
   the reading unit is configured to read the white reference member from a surface of the original platen glass that is opposite to the original document placement surface via the cutout portion, and
   the sealing member includes:
      a first adhesive material layer that faces the original document placement surface;
      a white base material layer that is arranged on the first adhesive material layer; and a second adhesive material layer that faces a peripheral end of the white reference member.

3. The image reading apparatus according to claim 2, wherein the first adhesive material layer is made from an adhesive material that has translucency.

4. The image reading apparatus according to claim 2, wherein a length of the white reference member in the direction of a shorter side thereof is longer than a length of the cutout portion of the sealing member in a direction of a shorter side thereof.

5. The image reading apparatus according to claim 1, further comprising a protection sheet for protecting the white reference member, the protection sheet being provided on the white reference member.

6. The image reading apparatus according to claim 5, wherein the protection sheet includes a plurality of indications serving as standards of sizes of the original document to be placed on the original platen glass; and a bump member that is salient in a direction of the thickness of the original platen glass, the bump member being configured to align the original document in a predetermined position by the original document bumping against the bump member, a direction of a longer side of the bump member being parallel to a main scanning direction of the image reading apparatus, and a direction of a shorter side of the bump member being parallel to a sub scanning direction of the image reading apparatus, a width of the bump member in the direction of a shorter side thereof being narrower than a width of the protection sheet in a direction of a shorter side thereof.

7. The image reading apparatus according to claim 6, wherein the plurality of indications are printed in locations on a surface of the protection sheet where the plurality of indications do not overlap the bump member.

8. The image reading apparatus according to claim 6, wherein a length of the bump member in the direction of its longer side is shorter than a length, in the sub scanning direction, of an original document of the smallest size of original document sizes indicated by the plurality of indications.

9. The image reading apparatus according to claim 1, wherein the sealing member has a cutout portion in its center, the white reference member is fixed on an original document placement surface of the original platen glass, with the sealing member intervening therebetween, the reading unit is configured so as to read the white reference member from a surface of the original platen glass that is opposite to the original document placement surface via the cutout portion, and the sealing member includes:
  a first adhesive material layer that faces the original document placement surface; and
  a white base material layer that is arranged on the first adhesive material layer.

10. The image reading apparatus according to claim 1, wherein a length of the white reference member in the direction of a shorter side thereof is longer than a length of the cutout portion in the direction of a shorter side thereof, the cutout portion being arranged in the center of the sealing member, and a peripheral end of the white reference member is adhered to the sealing member.

11. An image forming apparatus comprising an image reading apparatus and an image forming unit for forming, on a recording material, an image that was read by the image reading apparatus, the image reading apparatus including:

an original platen glass having translucency on which an original document can be placed;

a reading unit configured to read the original document placed on the original platen glass; and a white reference member that is fixed on the original platen glass with the use of a sealing member, wherein a surface of the sealing member that is in contact with the original platen glass being white, the white reference member and the sealing member being adhered to each other without generating a gap therebetween at ends of the white reference member in a direction of a shorter side thereof.

* * * * *